(12) United States Patent
Gulnac et al.

(10) Patent No.: US 11,765,171 B2
(45) Date of Patent: *Sep. 19, 2023

(54) MONITORING SECURITY CONFIGURATIONS OF CLOUD-BASED SERVICES

(71) Applicant: Bank of America Corporation, Charlotte, NC (US)

(72) Inventors: Justin P. Gulnac, Nesconset, NY (US); Travis E. Hoyt, Indian Land, SC (US); Kevin W. Nibler, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/369,769

(22) Filed: Jul. 7, 2021

(65) Prior Publication Data
US 2021/0336954 A1 Oct. 28, 2021

Related U.S. Application Data

(63) Continuation of application No. 16/431,026, filed on Jun. 4, 2019, now Pat. No. 11,095,644.

(51) Int. Cl.
*H04L 29/06* (2006.01)
*H04L 9/40* (2022.01)

(52) U.S. Cl.
CPC ...... *H04L 63/0884* (2013.01); *H04L 63/0281* (2013.01); *H04L 63/1425* (2013.01)

(58) Field of Classification Search
CPC ............ H04L 63/0884; H04L 63/0281; H04L 63/1425
See application file for complete search history.

(56) References Cited

U.S. PATENT DOCUMENTS

| | | | |
|---|---|---|---|
| 7,769,990 B1 | 8/2010 | Okcu et al. | |
| 8,181,253 B1 | 5/2012 | Zaitsev et al. | |
| 8,271,615 B2 | 9/2012 | Ellison et al. | |
| 8,359,223 B2 | 1/2013 | Chi et al. | |
| 8,578,442 B1 | 11/2013 | Banerjee | |
| 8,645,529 B2 | 2/2014 | Doddavula | |
| 8,813,225 B1* | 8/2014 | Fuller | H04L 67/51 726/25 |

(Continued)

*Primary Examiner* — Vance M Little

(57) ABSTRACT

A cloud-based service monitoring device includes a criteria database and an exceptions database. The criteria database includes predefined configuration criteria corresponding to approved operating parameters of each cloud-based service being monitored. The exceptions database includes predefined configuration exceptions such that, for a given instance, each configuration exception corresponds to a different instance-specific criteria than the associated configuration criteria for the cloud-based service. The monitoring device extracts configuration settings from instances of the cloud-based service and compares the settings to the configuration criteria of the cloud-based service. If a suspect setting is identified that does not satisfy the configuration criteria at the service level, the monitoring device compares the suspect setting to instance-specific criteria. If the setting does not satisfy both the configuration criteria and the instance-specific criteria, an alert message may be transmitted to an administrator's device.

20 Claims, 3 Drawing Sheets

(56) References Cited

U.S. PATENT DOCUMENTS

| | | |
|---|---|---|
| 8,935,382 B2 | 1/2015 | Sood et al. |
| 9,043,458 B2 | 5/2015 | Balaji et al. |
| 9,172,608 B2 | 10/2015 | Zeyliger et al. |
| 9,251,115 B2 | 2/2016 | Bursell |
| 9,354,939 B2 | 5/2016 | Ferris et al. |
| 9,384,112 B2 | 7/2016 | Petersen et al. |
| 9,385,934 B2 | 7/2016 | Baughman et al. |
| 9,407,664 B1 | 8/2016 | Banerjee |
| 9,483,334 B2 | 11/2016 | Walsh |
| 9,712,549 B2 * | 7/2017 | Almurayh ............ H04L 63/1425 |
| 9,769,147 B2 | 9/2017 | Mathew et al. |
| 9,813,307 B2 | 11/2017 | Walsh et al. |
| 9,826,100 B2 | 11/2017 | Hughes et al. |
| 9,942,756 B2 | 4/2018 | Conant et al. |
| 10,009,335 B2 | 6/2018 | Mathew et al. |
| 10,033,604 B2 | 7/2018 | Maes et al. |
| 10,073,605 B2 | 9/2018 | Ellison et al. |
| 10,200,387 B2 | 2/2019 | Muthukrishnan et al. |
| 10,216,503 B2 | 2/2019 | Chico De Guzman Huerta et al. |
| 2003/0084018 A1 | 5/2003 | Chintalapati et al. |
| 2003/0110252 A1 | 6/2003 | Yang-Huffman |
| 2004/0176996 A1 | 9/2004 | Powers et al. |
| 2006/0090195 A1 * | 4/2006 | Pearson .................. H04L 67/02 726/3 |
| 2006/0288251 A1 | 12/2006 | Jackson |
| 2010/0250712 A1 | 9/2010 | Ellison et al. |
| 2011/0145789 A1 | 6/2011 | Rasch et al. |
| 2013/0060933 A1 | 3/2013 | Tung et al. |
| 2014/0317701 A1 | 10/2014 | Eicken et al. |
| 2015/0071091 A1 | 3/2015 | Govil et al. |
| 2015/0074281 A1 | 3/2015 | Vendrow |
| 2015/0154039 A1 | 6/2015 | Zada et al. |
| 2015/0163121 A1 * | 6/2015 | Mahaffey ............ G06F 11/0754 707/687 |
| 2015/0381427 A1 | 12/2015 | Roskind et al. |
| 2016/0142262 A1 | 5/2016 | Werner et al. |
| 2016/0212175 A1 | 7/2016 | Nagaratnam et al. |
| 2016/0337175 A1 | 11/2016 | Rao |
| 2017/0005904 A1 | 1/2017 | Sharma et al. |
| 2017/0093702 A1 | 3/2017 | Teng et al. |
| 2017/0244598 A1 | 8/2017 | Crouse |
| 2017/0279826 A1 | 9/2017 | Mohanty et al. |
| 2018/0027006 A1 * | 1/2018 | Zimmermann ..... G06F 21/6218 726/11 |
| 2018/0054528 A1 | 2/2018 | Hughes et al. |
| 2018/0063182 A1 * | 3/2018 | Jones .................... G06F 21/577 |
| 2018/0114015 A1 | 4/2018 | Nuseibeh et al. |
| 2018/0131691 A1 * | 5/2018 | Sundaram P ......... H04L 67/141 |
| 2018/0324197 A1 | 11/2018 | Zettel, II et al. |
| 2018/0351960 A1 | 12/2018 | Karunakaran et al. |
| 2019/0087277 A1 | 3/2019 | Kore et al. |
| 2019/0141144 A1 | 5/2019 | Africa et al. |
| 2019/0289004 A1 * | 9/2019 | Kurian ................ H04L 63/0884 |
| 2020/0389454 A1 | 12/2020 | Gulnac et al. |

\* cited by examiner

MONITORING SECURITY CONFIGURATIONS OF CLOUD-BASED SERVICES

CROSS-REFERENCE TO RELATED APPLICATIONS

This application is a continuation of U.S. patent application Ser. No. 16/431,026 filed Jun. 4, 2019, by Justin P. Gulnac et al., and entitled "MONITORING SECURITY CONFIGURATIONS OF CLOUD-BASED SERVICES," which is incorporated herein by reference.

TECHNICAL FIELD

The present disclosure relates generally to cloud-based services. More particularly, the present disclosure relates, in certain embodiments, to systems and methods for monitoring the security configurations of instances of cloud-based services.

BACKGROUND

Cloud-based services allow decentralized users to efficiently access and use certain applications without requiring each user's device to execute the service or a corresponding application. Rather than being executed directly on the user's device, an instance of a cloud-based service is run in the cloud and accessed by the user via a network. Entities (e.g., companies, organizations, etc.) often acquire appropriate licenses that allow individuals associated with the entity to access and use multiple instances and sub-instances of the cloud-based services. For example, a given instance may be accessible to a certain subgroup or department of the entity, and each sub-instance may be accessed by an individual user or group of users within the subgroup. There exists a need for improved tools for monitoring the security of multiple instances of cloud-based services.

SUMMARY

Conventional systems for monitoring the security of cloud-based services are typically focused on monitoring user activity and identifying suspicious events based on this activity. For example, uncommon user activity, such as the sudden download of confidential client information may be detected and reported to an administrator because this activity is associated with a break of security protocols. Each user or a random selection of users may be monitored during certain intervals of time in an attempt to detect whether the services are being operated according to established best practices (e.g., as determined by some administrator). These conventional approaches generally only provide information after a security-related event (e.g., downloading confidential information) has occurred or as the event is occurring and otherwise fail to provide any indication of particular cloud-based services or instances of cloud-based services that pose an increased security risk. Additionally, significant memory and processing resources are generally required to monitor user activity for cloud-based services, particularly as the number of these users and services increases.

The present disclosure encompasses the recognition that, in order to reduce or eliminate risks to data security, the configuration settings of cloud-based services can be monitored to identify instances of the services that are a potential security risk. For example, the password configuration settings (e.g., settings related to the minimum length of user passwords and the particular types of alphanumeric characters used in passwords) of each instance of a cloud-based service can be monitored, and any instance with inappropriately relaxed password settings (e.g., with no minimum password length requirement) may be flagged as a suspect configuration setting for further evaluation and appropriate correction. Thus, rather than monitoring user activity alone, as in conventional approaches, alternative or additional risk indicators can be determined by continuously or regularly monitoring security-related configuration settings of the cloud-based services themselves in order to identify security risks before any security-related event has necessarily occurred and events which would have gone undetected using conventional approaches.

In one embodiment, the cloud-service device determines configuration settings (e.g., operating parameters) of an instance of a cloud-based service. The settings may, for example, include data security settings (e.g., related to password length requirements, maximum idle time before automatic log-out, etc.). The device uses these settings to determine a suspect configuration setting by comparing the configuration settings to configuration criteria (e.g. stored in a database). The device may store the suspect configuration setting in a result data file, which may be transmitted to an administrator for further action (e.g., to correct the suspect settings). In some cases, a certain instance may be permitted to operate with less restrictive security settings. For example, a department of an entity that does not have access to confidential information may be permitted to allow access from a broader range of IP addresses. The device generally takes these configuration exceptions into account before flagging any particular instance or any particular configuration setting as a suspect setting, thereby resulting in fewer false-positive risk identifications from the device.

The systems and methods described in the present disclosure provide a technical solution to the technical problems of previous technologies, including those described above, by employing a cloud-service monitoring device to accurately and efficiently detect deviations from proper security settings in cloud-based services. The disclosed system provides several technical advantages which include (1) reduced waste of system resources compared to previous approaches that require expensive user-activity monitoring, (2) improved identification of at-risk cloud-based services and/or at-risk instances of cloud-based services that are particularly susceptible to security threats, and (3) improved user privacy. For instance, some embodiments of the systems and methods described herein allow this improved risk detection while improving user privacy compared to conventional approaches (e.g., because, in some embodiments, user activity is not tracked to identify suspect instances of cloud-based services).

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by monitoring the configuration settings of instances of cloud-based services and determining whether the monitored settings are associated with a possible security risk. Rather than monitoring user activity alone, the present disclosure contemplates monitoring the settings of the services themselves to identify and flag instances that are being operated outside of predefined, instance-specific security protocols and are thus more prone to security risks.

Figure 1:
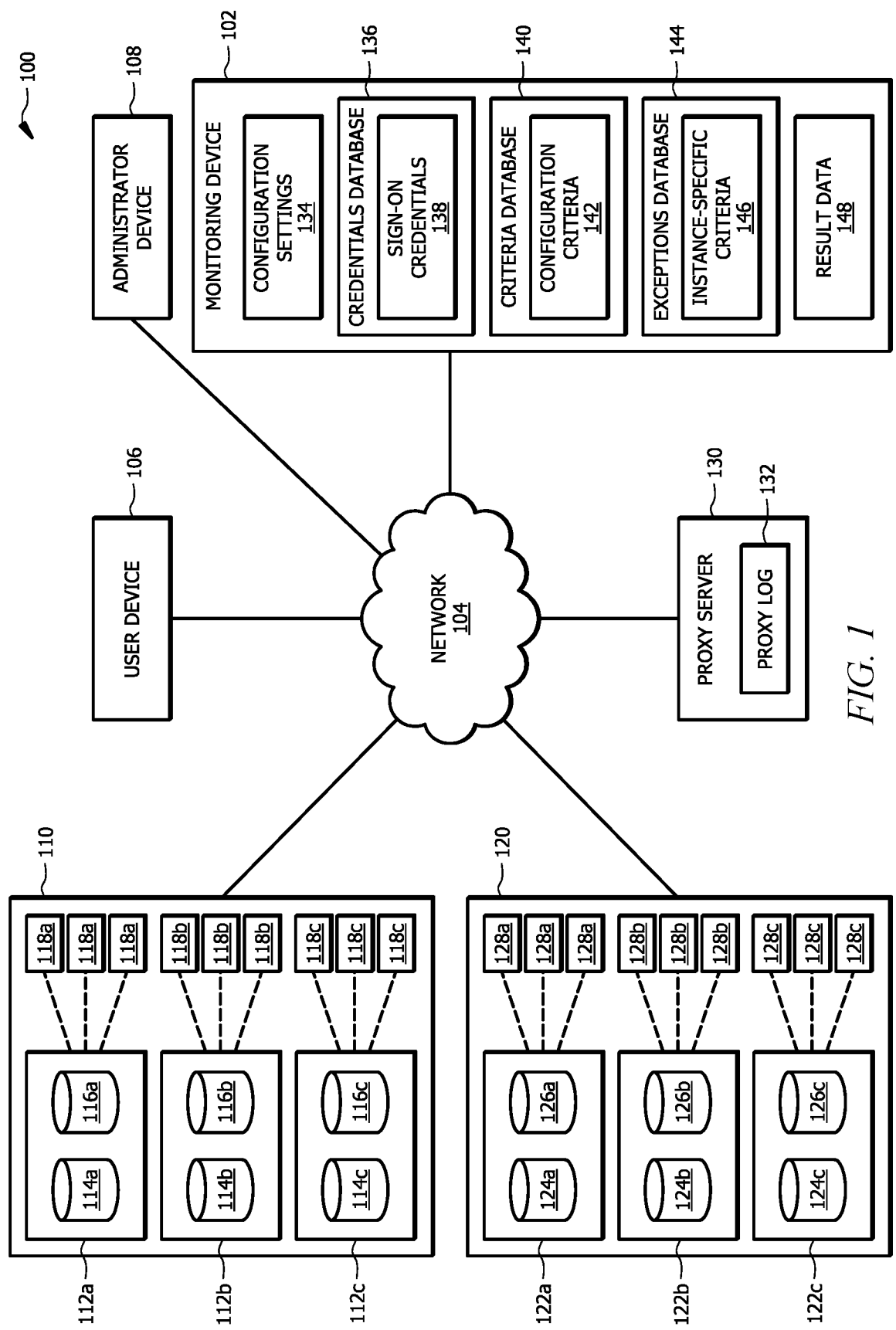
FIG. 1 is a schematic diagram of cloud-service monitoring system, according to an illustrative embodiment of the present disclosure.

FIG. 1 is a schematic diagram of an example cloud-service monitoring system 100, according to an illustrative embodiment of the present disclosure. The cloud-service monitoring system 100 is generally configured to monitor services 110 and 120 and determine whether the configuration settings of any instance 112a-c, 122a-c of these services might be associated with a security risk. In contrast to conventional systems, the cloud-service monitoring system 100 performs functions that facilitate the efficient and effective monitoring of cloud-based service security without necessarily monitoring the activities of each individual user. Thus, system 100 provides cloud-service monitoring, while protecting the privacy of users.

The cloud-service monitoring system 100 comprises a monitoring device 102, a network 104, a user device 106, an administrator device 108, a first cloud-based service 110, a second cloud-based service 120, and an optional proxy server 130. The cloud-service monitoring system 100 may be configured as shown or in any other suitable configuration. An example of the cloud-service monitoring system 100 in operation is described with respect to FIG. 2.

Examples of cloud-based services 110 and 120 include applications, software and any other service hosted in a network environment. Cloud-based services 110 and 120 are generally hosted by third parties and thus represent a security risk for users accessing the services 110 and/or 120. The first cloud-based service 110 includes at least a first instance 112a, a second instance 112b, and a third instance 112c. Each of instances 112a-c may include or be associated with one or more corresponding sub-instances 118a-c. For example, an instance 112a of service 110 may correspond to a first cloud-hosted application used by a plurality of users associated with a first entity, while each sub-instance 118a of instance 112a may correspond to an instance that is used or accessed by one of the users. Each of instances 112a-c includes corresponding configuration settings 114a-c and other instance data 116a-c. The configuration settings 114a-c include operating parameters for instances 112a-c, as described in greater detail below. Each of the sub-instances 118a-c includes the same or similar information.

Similarly to the first cloud-based service 110, the second cloud-based service 120 includes at least a first instance 122a, a second instance 122b, and a third instance 122c. Each of instances 122a-c may include one or more corresponding sub-instances 128a-c. For example, an instance 122a of service 120 may correspond to a second cloud-hosted application used by a plurality of users associated with a second entity, while each sub-instance 128a of instance 122a may correspond to an instance of the application accessed or used by one of the users. Each of instances 122a-c includes corresponding configuration settings 124a-c and other instance data 126a-c. The configuration settings 124a-c include the security settings for the corresponding instance 122a-c, as described in greater detail below. Each of the sub-instances 128a-c includes the same or similar information.

The monitoring device 102 is configured to extract and/or receive and store security configuration settings 134 from any one or more of instances 112a-c or 122a-c or sub-instances 118a-c or 128a-c. The monitoring device stores sign-on credentials 138 for accessing the various instances 112a-c or 122a-c and sub-instances 118a-c or 128a-c in a credentials database 136. The sign-on credentials 138 may include, for example, a username and password for signing on to the instances 112a-c or 122a-c and sub-instances 118a-c or 128a-c to extract configuration settings 134. The monitoring device 102 generally compares these settings 134 to configuration criteria 142 of the criteria database 140 and instance-specific criteria 146 of the exceptions database 144 to determine whether any of the instances 112a-c, 122a-c and/or the sub-instances 118a-c, 128a-c are operating outside of permitted security settings. The monitoring device 102 is operable to generate and store result data 148 based on this determination. The result data 148 may, for example, include a list comprising one or more instances and/or sub-instances with suspect configuration settings. Suspect configuration settings are generally those that both fall outside of the global configuration criteria and do not correspond to an instance-specific criteria 146. The result data 148 may further be transmitted to another device (e.g., administrator device 108) for review by an administrator of network 104, the monitoring device 102, and/or services 110 and 120.

As described in greater detail with respect to FIG. 3 below, the monitoring device 102 generally includes a memory 304, a network interface 306, and one or more processors 302 operably coupled to the memory 304 and the network interface 304. The memory 304 of the monitoring device 102 generally stores any suitable set of instructions, logic, rules, or code operable to execute the function described herein. The memory 304 is operable to store configuration settings 134, configuration criteria 142, instance-specific criteria 146, result data 148, and/or any other data or instructions. The one or more processors 302 of the monitoring device 102 are configured to implement the instructions stored in the memory 304. For example, the one or more processors 302 are configured to execute instructions to implement the function disclosed herein, such as some or all of method 200, described below. The network interface 306 of the monitoring device 102 facilitates wired and/or wireless communications amongst the components of the system 100. The network interface 306 communicates data between the monitoring device 102 and other network devices, systems, or domain(s).

Administrator device 108 is generally any device capable of receiving, via the network 104 or through other wired or wireless communication, data and/or alerts from the monitoring device 102. For example, device 108 may be a device (e.g., a computer or mobile device) of an administrator or an administrative entity tasked with monitoring the security of services 110, 120 and/or network 104. The administrator device 108 receives result data 148 from the monitoring device 102 and any alerts associated with this result data 148. In some embodiments, the administrator device 108 accesses the monitoring device 102 to configure various settings, parameters, and/or instructions used to perform the processes described herein. For instance, the administrator device 108 may update and/or modify information related to the configuration settings 134, the configuration criteria 142, and the instance-specific criteria 146. The administrator device 108 may further manage settings related to the type and amount of result data 148 that are determined by the monitoring device 102 and how the result data 148 are formatted for transmission and display on the administrator device 108.

The user device 106 is generally any device capable of accessing, via the network 104, the cloud-hosted services 110, 120. For example, device 106 may be a device (e.g., a computer or mobile device) of a user that is accessing service 110 and/or service 120. In a typical implementation, the user device 106 may access an instance or sub-instance of service 110 such that the application associated with the instance is displayed on the user device 106. Input provided at the user device 106 may facilitate interaction with the application in an approximation of having the application executed directly on the user device 106.

Network 104 facilitates communication between and amongst the various components of the system 100. This disclosure contemplates network 104 being any suitable network operable to facilitate communication between the components of the system 100. Network 104 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In some embodiments, the system 100 includes a proxy server 130 that acts as an intermediary between the user device 106 and the services 110 and 120. The proxy server 130 may include a proxy log 132, which is a record of user traffic on the network 104. In some embodiments, the proxy log 132 is used to identify one or more candidate instances that may be associated with a security risk based on the network traffic. For instance, machine learning may be used to identify security risks based on network traffic information in the proxy log 132. For example, a machine learning model may be trained using proxy log data for services with positively identified security risks over a training time interval (e.g., of weeks, months, or longer). Once the model is trained, it may be used to identify security risks based at least in part on the proxy log data. Generally, the model may also be based on information about the configuration settings 134, configuration criteria 142, and/or any instance-specific criteria 146.

In an example operation of the cloud-service monitoring system 100, the monitoring device 102 monitors each of instances 112a-c of service 110. The device 102 may, for example, retrieve the configuration settings 134 at regular intervals (e.g., hourly, daily, biweekly, weekly, or monthly) and store the settings in a memory of the device 102. The settings may be stored in any appropriate format, for example, in a database or one or more data tables.

The device 102 then compares the received configuration settings 134 to configuration criteria 142 to identify any suspect configuration settings that are outside a range of permitted values defined by the configuration criteria 142. Examples of configuration criteria 142 include a maximum number of failed login attempts before blocking access to the instance; a maximum idle time by a user before automatic log out from the instance; Internet Protocol (IP) restrictions for the instance; and password complexity requirements for the instance; among others. In some embodiments, the configuration criteria 142 may be related to whether available security tools are activated in the instance (e.g., whether a cross-site request forgery prevention tool is activated), whether browser options are placed in a predetermined secure configuration (e.g., whether an HTTP strict-transport-security header is enabled in the browser), whether the instance is enabled to allow access via a mobile device, whether preferred user authentication protocols are enabled and enforced for all users, and/or whether secure communication protocols (e.g., a secure transfer protocol such as an "HTTPS" protocol) is enforced for all connections to the instance.

Some of the configuration criteria 142 may be related to a binary option (e.g., a "yes/no" setting or "on/off" setting), and the monitoring device 102 determines whether each setting matches the permitted setting (i.e., the "yes" or "no" setting). Other settings may have corresponding numeric values which must be equal to, greater than, or less than a corresponding threshold value to be considered "within" a range corresponding to a configuration criteria. For example, a configuration criteria for a maximum number of failed login attempts may be six for a given service or instance of the service. If the service is configured with a maximum number of failed login attempts of ten, the service will be determined to be not within the criteria 142 because the actual setting is ten, which is greater than the criteria value of six. Certain configuration criteria 142 may comprise a combination of related criteria. For example, a password complexity criteria may include a minimum number of characters required in a sign-on password for the instance and an option setting (e.g., a "yes/no" setting or "on/off" setting) criteria for whether the password includes a special character.

Any configuration settings 134 that are outside the ranges permitted by the configuration criteria 142 are determined to be suspect settings. Before reporting the suspect settings as possibly being associated with a security risk, however, the monitoring device 102 generally first accesses the exceptions database 144 to ensure that the instance in which the suspect settings are identified are not permitted based on rules that are specific to the instance. For example, an entity associated with a given instance may have a unique security profile, resulting in correspondingly more or less restrictive security requirements for the instance.

In some embodiments, instance-specific criteria 146 define less restrictive configuration settings 134 for a particular instance (e.g., an instance associated with a particular user or entity with less restrictive security requirements). For instance, an entity with less restrictive instance-specific criteria 146 may not process or store a significant amount of confidential information. Thus, the entity may have relaxed or less restrictive security rules reflected in the exceptions database 144. Less restrictive instance-specific criteria 146 will generally result in the improved determination of suspect instances by decreasing the number of false positive identifications of suspect settings, such that the instance will not be flagged for breaking security rules when the configuration settings 134 are outside the configuration criteria 142 but are within the less restrictive, instance-specific policies reflected in the exceptions database 144.

In some embodiments, instance-specific criteria 146 define more restrictive configuration settings 134 for a particular instance. For example, a particular entity or user associated with the instance may have more restrictive security needs and a corresponding policy that is more restrictive than the more globally defined configuration criteria 142. For example, an entity with more restrictive instance-specific criteria 146 may store and/or process a significant amount of security-sensitive information. More restrictive instance-specific criteria 146 will generally result in the improved determination of suspect instances by decreasing the number of false negative identifications of suspect settings, such that the instance will still be flagged for having a suspect setting when the configuration settings 134 are within the configuration criteria 142 but are outside the more restrictive instance-specific criteria 146, rules, and/or policies reflected in the exceptions database 144.

Configuration settings 134 that do not conform with the instance-specific criteria 146 are generally flagged and included in the result data 148, which may be stored in the device 102 and transmitted to the administrator device 108 for further review and action by an administrator. This allows the administrator to efficiently review any instances that are linked to potential security risks even when a security-related event has not necessarily occurred.

Settings that conform with both the configuration criteria 142 and the instance-specific criteria 146 are generally not flagged for further review and generally are not included as entries in the result data 148. The result data 148 may, however, include an indication that the configuration settings 134 for the instance are in conformance with security requirements (i.e., as reflected by the configuration criteria 142 and the exceptions database 144). This provides a historical record which may be used for longitudinal analysis of any changes in the configuration settings 134 of each instance and/or for training one or more machine learning models for aiding in the determination of suspect configuration settings. For example, this historical record may be used to identify changes over time and/or any other trend(s) in the configuration settings 134 to determine instances which may have a security risk. For instance, a brief but statistically significant change to security-related configuration settings 134 may be related to a sudden security risk. The device 102 can flag any determined changes and report them to an administrator for further evaluation as appropriate. For example, if a given instance has a long history of having a consistently enforced password requirements setting but the password requirements setting suddenly becomes less restrictive for a time interval, the device 102 may flag this instance as having a suspect configuration setting for further risk assessment (e.g., by an administrator). As another example, a sudden and/or brief change to whether mobile access is allowed may be related to a security risk. Mobile access may not be prohibited for the application. However, even if the setting is not outside of the permitted range defined by the configuration criteria 142 and/or the instance-specific criteria 146, the device may still identify and flag instances for further review (e.g., as part of result data 148).

In some embodiments, the monitoring device 102 uses information in the proxy log 132 to identify additional candidate instances that are suspected of being a security threat or risk. The candidate instances may be communicated to an appropriate administrator for further review (e.g., by transmitting a list of the candidate instances to the administrator device 108). These candidate instances may or may not be violating the security rules reflected in the configuration criteria 142 and exceptions database 144. For example, the proxy server 130, acting as an intermediary between the user device 106 and the services 110 and 120, may monitor user access of the services 110 and 120 and record this activity in the proxy log 132. Based on this recorded activity data, the monitoring device 102 may determine instances that are candidates for further security review. For example, a machine learning model may be used to identify security risks based on network traffic information in the proxy log 132. The machine learning model may be trained using proxy log data for services with positively identified security risks over a training time interval (e.g., of weeks, months, or longer). Once the model is trained, it may be used to identify security risks based at least in part on the proxy log data. The model may also be based on information about the configuration settings 134, configuration criteria 142, and/or any instance-specific criteria 146.

Figure 2:
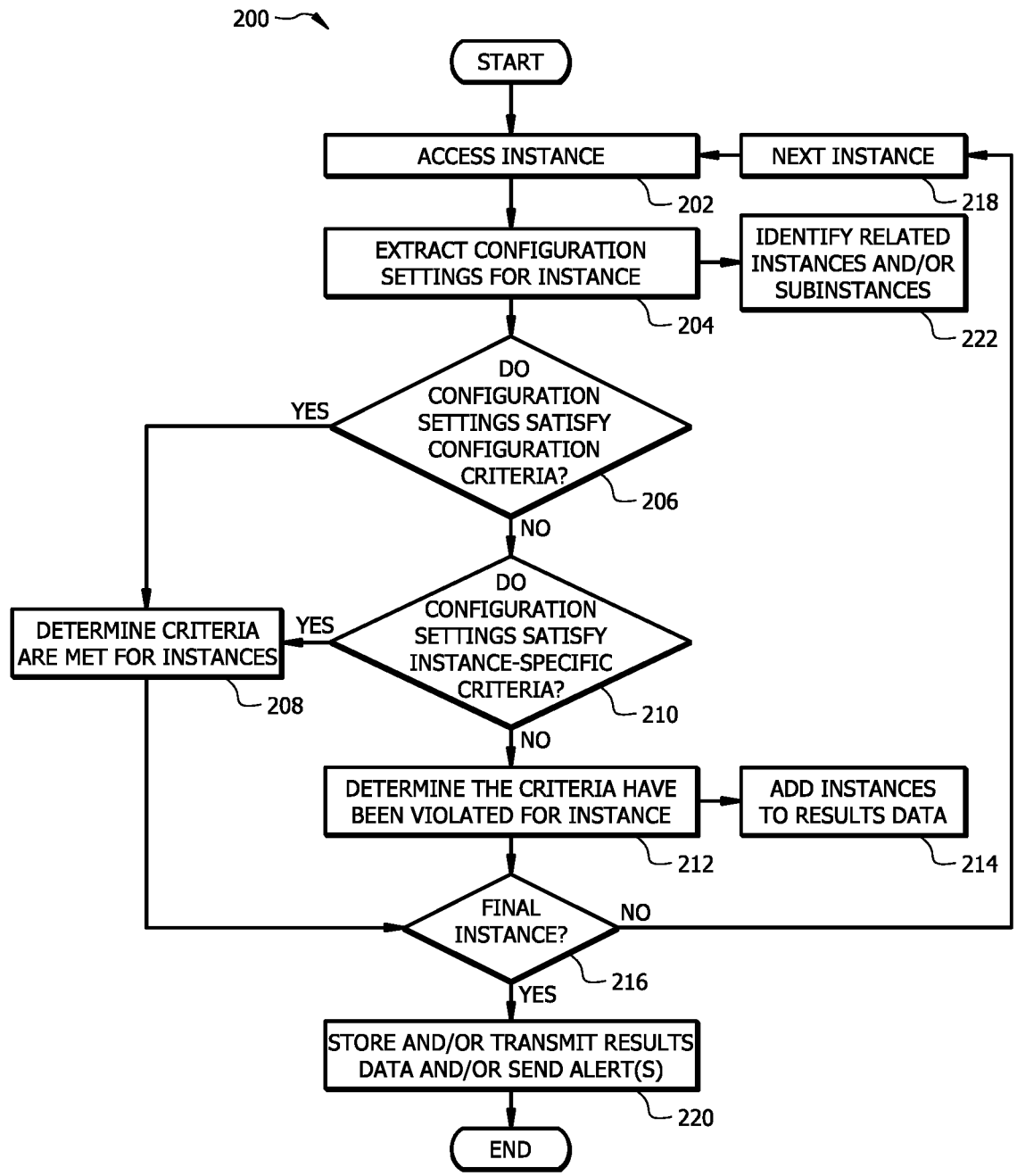
FIG. 2 is a flowchart of a method for operating the cloud-service monitoring system of FIG. 1.

FIG. 2 is a flowchart of a method 200 of monitoring one or more instances of a cloud-based service, according to an illustrative embodiment of the present disclosure. The cloud-service monitoring system 100 may implement method 200 to monitor one or more services (e.g., services 110 and/or 120 of FIG. 1).

At step 202 of method 200, an instance of a service is accessed by the monitoring device 102. The device 102 may access the instance by automatically navigating to a login portal of the instance, entering appropriate login credentials in the portal, and submitting the credentials. The monitoring device 102 generally stores appropriate sign-on credentials 138 for accessing each instance that is monitored. For example, the monitoring device 102 may store administrator credentials that facilitate access to, and administrator privileges within, each instance being monitored.

At step 204, the configuration settings 134 of the instance are extracted. For example, after the monitoring device 102 accesses the instance (at step 202), the device 102 may extract configuration settings 134 for the instance by navigating to a portion or directory of the instance that is associated with the configuration settings 134, identify relevant configuration settings 134 for the subsequent function performed by the monitoring device 102, and copy these settings to a memory of the monitoring device 102. For example, the device 102 may access the configuration settings 134 in a page of the instance that is configured for inputting and/or editing the settings. The device 102 may also or alternatively access configuration settings 134 in a directory of the instance where the settings may be viewed or accessed as entries, object, or tags in the directory. In some embodiments, the device 102 retrieves a copy of each of the configuration settings 134 for the instance. However, in other embodiments, the device 102 may identify particular settings that are of interest (e.g., related to one or more particular security risks) and only retrieves these particular settings. For instance, the device 102 may not retrieve settings associated with how a graphical display is configured if these display settings are not associated with the security of the instance, thereby reducing waste of resources used for storing and processing configuration settings 134 that are not related to security of the service or instance. Device 102 may determine which settings to retrieve (i.e., to access in the instance and copy to memory) by determining, using a lookup table, a setting type for each configuration setting 134 and retrieving settings of one or more types that are used in subsequent steps of method 200.

At step 206, the monitoring device 102 determines whether the configuration settings 134 determined for the instance satisfy the configuration criteria 142 stored in memory of the monitoring device 102. In other words, the monitoring device 102 determines whether the configuration settings 134 fall within a predetermined range of settings defined by the configuration criteria 142. Generally, any setting that is outside a first range of permitted values defined by the configuration criteria 142 is determined to be a suspect configuration setting. If the configuration settings 134 are missing a setting corresponding to one of the configuration criteria 142, the missing setting may be included in the result data 148, thereby facilitating further review of the instance by an administrator.

If the configuration settings 134 of the instance satisfy the configuration criteria 142, the monitoring device 102 proceeds to step 208 and determines that the criteria are met for the instance. Based on this determination, the monitoring device 102 generally does not flag the instance as a possible risk or a suspect instance. The monitoring device 102 may store a record of the determination (e.g., along with a time stamp corresponding to the time of the determination) to provide a historical record of the risk status of the instance (e.g., for longitudinal analysis of the configuration settings 134 and/or for training a machine learning model). The monitoring device 102 then determines whether this is the final instance to review (step 216). If this is not the final instance to review, the monitoring device 102 proceeds to the next instance (step 218) and begins method 200 again at step 202 to evaluate the next instance.

If at least one of the configuration settings 134 of the instance is not within the configuration criteria 142 (i.e., if a suspect configuration setting is detected), the monitoring device 102 proceeds to step 210 to determine whether the configuration settings 134 satisfy the instance-specific criteria 146. The configuration exceptions 142 may define a second range of permitted values for the suspect configuration setting. If at least one of the configuration settings 134 is not within the second range of permitted values, the monitoring device 102 determines that the configuration settings 134 do not satisfy the instance-specific criteria 146. To make this determination, the monitoring device 102 generally accesses the instance-specific criteria 146, compares each of the configuration settings 134 to a corresponding instance-specific criteria 146 (if any), and determines whether the instance-specific criteria 146 are satisfied, based on the comparison.

If the configuration settings 134 of the instance satisfy the instance-specific criteria 146, the monitoring device proceeds to step 208 and determines that the security criteria, which reflect both the configuration criteria 142 and instance-specific criteria 146, are met for the instance. As an example, a password length setting may define a minimum number of characters of six, while the configuration criteria 142 include a minimum password length criteria of nine, resulting in a setting that does not satisfy the configuration criteria 142 in step 206. However, an instance-specific criteria 146 for the password criteria may indicate that the minimum password length for the instance is six. In this example case, the monitoring device 102 will determine that the instance satisfies the instance-specific criteria 146 for the password criteria for the instance (i.e., because the setting value of six is equal to or greater than the exception value of six). This prevents false positive identification of security risks by the monitoring device 102.

Configuration settings 134 that conform with both the configuration criteria 142 and the instance-specific criteria 146 are generally not flagged for further review and generally are not included as entries in the result data 148. The result data 148 may, however, include an indication that the configuration settings 134 are in confirmation with security policies (i.e., as reflected by the configuration criteria 142 and the instance-specific criteria 146), providing a historical record for future analysis. The monitoring device then determines whether this is the final instance to review (step 216). If this is not the final instance to review, the monitoring device 102 proceeds to the next instance (step 218) and begins method 200 again at step 202. If at least one of the configuration settings 134 of the instance does not satisfy the instance-specific criteria 146, the monitoring device proceeds to step 212 and determines that the security criteria (i.e., the criteria resulting from the combined use of the configuration criteria 142 and the instance-specific criteria 146) are violated for the instance.

At step 214, the instance with the suspect configuration from step 212 is added to the result data (e.g., to result data 148 of FIG. 1). For example, an entry may be added to a result data 148 that includes an identifier of the instance and an identification of the configuration settings 134 determined to be outside the bounds set by the instance-specific criteria 146 and/or the configuration criteria 142. The entry may further include an identifier of an entity associated with the instance, a timestamp corresponding to the time when the determination of step 212 is completed, and any other information related to the instance or configuration settings 134 that may facilitate review of the instance by an administrator. In some embodiments, the monitoring device 102, in step 222, uses the configuration settings 134 determined in step 204 to identify additional related instances or sub-instances which may be evaluated by the monitoring device 102. For example, the monitoring device 102 may identify other instances and/or sub-instances with similar configuration settings 134 to those of the initial instance being evaluated.

After the final instance has been evaluated using method 200, as determined in step 216, the monitoring device 102 proceeds to step 220 to store the result data 148 and/or transmit the result data 148 as well as one or more alerts to the administrator device 108. As described above, the result data 148 generally includes information about instances that are determined in step 212 to not conform with at least one of the instance-specific criteria 146 and at least one of the configuration criteria 142. An alert may also or alternatively be transmitted to the administrator device 108. For instance, if a particular instance meets certain alert thresholds, an alert may be transmitted to the administrator device 108. An alert threshold may be a number of configuration criteria 142 that the instance can violate or an extent to which a given setting value can depart from the criteria 142 or 146 value before an alert is sent. An alert threshold of three, for example, corresponds to the case where an alert is sent when three or more configuration criteria 142 are violated by the instance. In some instances, an alert may be based on a security sensitivity associated with a type of the configuration criteria 142 that is violated by the instance. For example, if a password criteria (e.g., a criteria of the "password" type) is considered security sensitive and the instance violates the password criteria (e.g., by not requiring a password with a minimum number of alphanumeric characters), an alert may be sent to the administrator device 108 that includes information about the instance and the violated password criteria.

Figure 3:
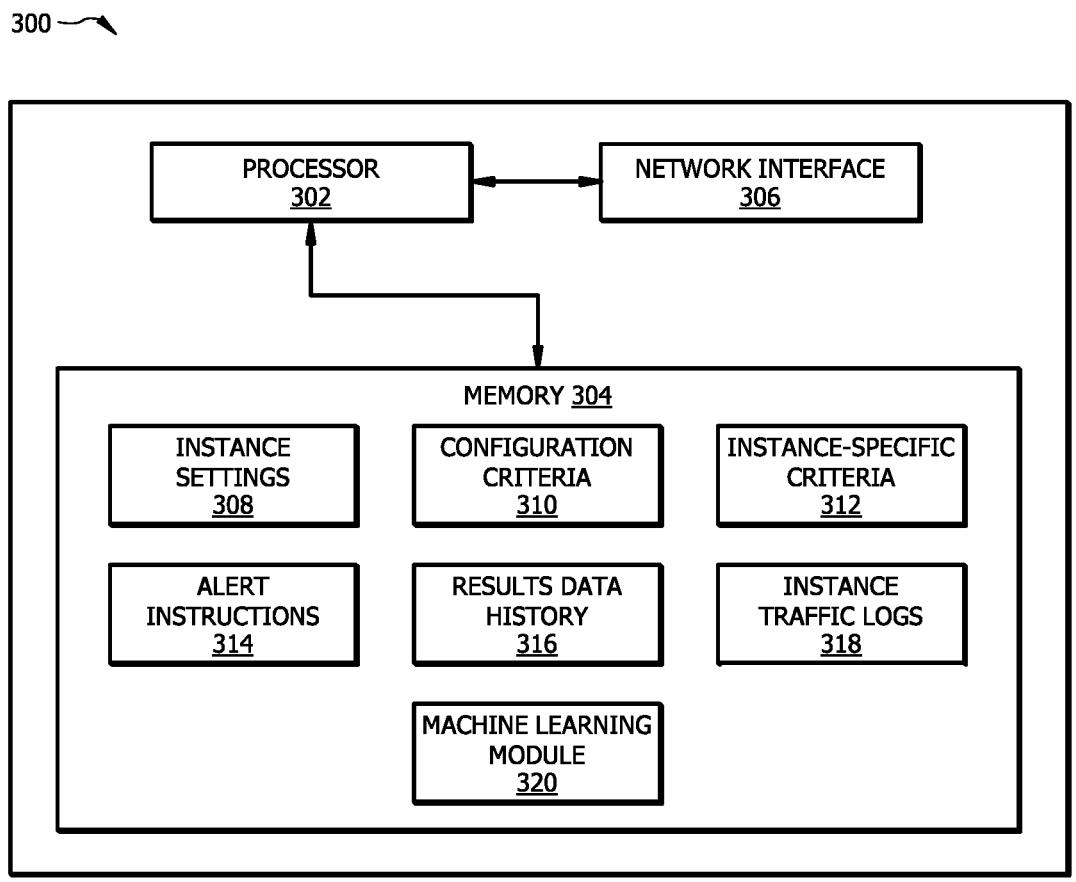
FIG. 3 is an embodiment of a device configured to implement the cloud-service monitoring system of FIG. 1.

FIG. 3 is an embodiment of a device 300 configured to implement the cloud-service monitoring system 100 shown in FIG. 1. For example, the device 300 may be the monitoring device 102 shown in FIG. 1. The device 300 comprises a processor 302, a memory 304, and a network interface 306. The device 300 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The processor 302 is configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 302 is configured to implement various instructions. For example, the one or more processors are configured to execute instructions to implement the function disclosed herein, such as some or all of method 200. In an embodiment, the function described herein is implemented using logic units, FPGAs, ASICs, DSPs, or any other suitable hardware or electronic circuitry.

The memory 304 is operable to store configuration settings 308, configuration criteria 310, instance-specific criteria 312, alert instructions 314, result data history 316, instance traffic logs 318, machine learning model 320 and/or any other data or instructions. Each of the items stored in the memory 304 may comprise any suitable set of instructions, logic, rules, or code operable to execute the function described herein. The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The configuration settings 308 generally define the operating parameters and/or rules imposed on a given instance or sub-instance of a cloud-based service. Examples of configuration settings 308 include a maximum number of failed login attempts an instance will allow before blocking access to the instance, a maximum idle time by a user before automatic log out from the instance, Internet Protocol (IP) restrictions imposed by the instance, and password complexity requirements imposed by the instance (e.g., minimum password length and formatting requirements for the password). The configuration settings 308 may be stored and arranged in any format. For example, the configuration settings 308 may be stored in a database that includes files, directories, and/or queues.

The configuration criteria 310 generally include ranges of permitted values for the configuration settings 308. The configuration criteria 308 are generally selected to ensure that instances of cloud-based services are operated according to predefined security guidelines. Examples of configuration criteria 142 include a permitted maximum number of failed login attempts before blocking access to the instance, a permitted maximum idle time by a user before automatic log out from the instance, permitted Internet Protocol (IP) restrictions, and permitted password complexity requirements. In some embodiments, the configuration criteria 142 may be related to whether available security tools are activated in the instance (e.g., whether a cross-site request forgery prevention tool is activated), whether browser options are placed in a predetermined secure configuration (e.g., whether an HTTP strict-transport-security header is enabled in the browser), whether the instance is enabled to allow access via a mobile device, whether preferred user authentication protocols are enabled and enforced for all users, and/or whether secure communication protocols (e.g., a secure transfer protocol such as an "HTTPS" protocol) is enforced for all connections to the instance. The configuration criteria 310 may be stored and arranged in any format. For example, the configuration criteria 310 may be stored in a database that includes files, directories, and/or queues.

The instance-specific criteria 312 are instance-specific configuration criteria that are unique to one or more particular instances and/or sub-instances of a cloud-based service. The instance specific criteria 312 are the same as or similar to the instance-specific criteria 146 described above with respect to FIG. 1. Each of the instance-specific criteria 312 defines a second range of permitted values for a corresponding configuration setting 308 that is different than the first range of permitted values defined by the configuration criteria 310 for that setting. In some embodiments, instance-specific criteria 312 are less restrictive than their corresponding configuration criteria 310 such that the second range of permitted values for the setting is broader than the first range of permitted values defined by the configuration criteria. The instance-specific criteria 312 may be stored and arranged in any format. For example, the instance-specific criteria 312 may be stored in a database (e.g., such as exceptions database 144 of FIG. 1) that includes files, directories, and/or queues.

The alert instructions 314 are generally used by the device 300 to determine when an alert should be transmitted and how the alert should be formatted (e.g., what information the alert should include and how it should be displayed on an administrator device). Alert instructions may include for example an alert threshold corresponding to each configuration criteria 310 and/or each instance exception 312. An alert may be transmitted to an administrator if a configuration setting 308 departs from the permitted range of settings defined by the configuration settings 308 and/or the instance-specific criteria 312 by greater than the threshold amount. For example, if a configuration criteria permits a password character count of nine and an instance's configuration settings 308 include a password character count requirement of three characters, the password setting departs from the permitted value by six characters (i.e., 9 required characters by the criteria–3 characters defined in the configuration settings=6 characters). For an example alert threshold of three characters, the device 300 determines that the difference between the value permitted by the configuration criteria (9) and the actual configuration setting (3) is greater than or equal to the threshold value (6), and an alert is transmitted to an administrator device for the password requirement setting.

The result data history 316 is generally a log of past result data (e.g., result data 148 of FIG. 1) that has been determined by the device 300. The result data history 316 can be used for longitudinal analysis of services or instances (e.g., analysis of changes to instance configuration settings over time) and to train the machine learning model 320 to aid in identifying instances with suspect configuration settings. The result data history 316 may be stored and arranged in any format. For example, the result data history 316 may be stored in a database that includes files, directories, and/or queues.

The instance traffic logs 318 include a record of network traffic to instances and sub-instances of each service being monitored by the device 300. For example, a proxy server (e.g., proxy server 130 of FIG. 1) acting as an intermediary between user devices and the monitored services may generate a proxy log, which is a record of user traffic on the network. Information from the proxy log (e.g., proxy log 132 of FIG. 1) may be stored in the instance traffic logs 318 for further analysis and/or for training the machine learning model 320. The instance traffic logs 318 may be stored and arranged in any format. For example, the instance traffic logs 318 may be stored in a database that includes files, directories, and/or queues.

The machine learning model 320 is generally used to aid in the identification of security risks based on network traffic information. For example, the machine learning model 320 may be trained using information in the instance traffic logs 318 related to services with positively identified security risks over a training time interval (e.g., of weeks, months, or longer). Once the model 320 is trained, it may be used to identify security risks based at least in part on real-time network traffic information (e.g., determined from proxy log 132 of FIG. 1). The machine learning model may also use information from report history 316, the instance-specific criteria 312, configuration criteria 310, and/or configuration settings 308 for training and analysis.

The network interface 306 is configured to enable wired and/or wireless communications. The network interface 306 is configured to communicate data between the device 300 and other network devices, systems, or domain(s). For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An apparatus comprising:
a memory configured to store:
a credentials database comprising sign-on credentials for accessing a plurality of instances of a cloud-based service;
a criteria database comprising predefined configuration criteria corresponding to approved operating parameters of the cloud-based service; and
an exceptions database comprising predefined configuration exceptions corresponding to at least a portion of the plurality of instances, wherein, for a given instance, each configuration exception comprises a different instance-specific criteria than the corresponding configuration criteria for the cloud-based service; and
a hardware processor communicatively coupled to the memory and a network, the hardware processor configured to:
access, via the network, using first credentials from the credentials database, a first instance of the cloud-based service;
extract first configuration settings of the first instance, wherein the first configuration settings comprise first operating parameters for the first instance;
determine, using the criteria database, a first suspect configuration setting from the first configuration settings by comparing the first configuration settings to the configuration criteria for the cloud-based service, wherein the first suspect configuration setting does not satisfy the configuration criteria;
determine, using the exceptions database, whether the first suspect configuration corresponds to a first configuration exception of the first instance;
responsive to determining the first suspect configuration setting corresponds to the first instance-specific configuration exception, determine whether the first suspect configuration setting satisfies a first instance-specific criteria of the first configuration exception; and
responsive to determining the first suspect configuration setting does not satisfy the first instance-specific criteria, transmit a first alert message comprising the first suspect configuration setting to an administrator device associated with monitoring security of the network.

2. The apparatus of claim 1, wherein the processor is further configured to, responsive to determining that the first suspect configuration setting does not meet the instance-specific criteria, store the suspect configuration setting in the result data file.

3. The apparatus of claim 1, wherein the processor is further configured to transmit the first alert message comprising the first suspect configuration setting to a computing device associated with use of the first instance.

4. The apparatus of claim 1, wherein the processor is further configured to:
monitor network traffic using a proxy log for the network;
identify one or more candidate instances based on the network traffic; and transmit a list comprising the one or more candidate instances to an administrator computing device for further review.

5. The apparatus of claim 1, wherein each instance-specific criteria of the instance exceptions is less stringent than a corresponding configuration criteria for the cloud-based service.

6. The apparatus of claim 1, wherein the processor is further configured to prevent storage, in the memory, of user activity information for the first instance.

7. The apparatus of claim 1, wherein the first operating parameters comprise one or more of a maximum number of failed login attempts before blocking access to the instance, a maximum idle time by a user before automatic log out from the instance, Internet Protocol (IP) restrictions for the instance, and password complexity requirements for the instance.

8. A method, the method comprising:
accessing, via a network, using first credentials from a credentials database, a first instance of the cloud-based service, wherein the credentials database comprises sign-on credentials for accessing a plurality of instances of a cloud-based service;
extracting first configuration settings of the first instance, wherein the first configuration settings comprise first operating parameters for the first instance;
determining, using a criteria database, a first suspect configuration setting from the first configuration settings by comparing the first configuration settings to the configuration criteria for the cloud-based service, wherein the first suspect configuration setting does not satisfy the configuration criteria, wherein the criteria database comprises predefined configuration criteria corresponding to approved operating parameters of the cloud-based service;
determining, using an exceptions database, whether the first suspect configuration corresponds to a first configuration exception of the first instance, wherein the exceptions database comprises predefined configuration exceptions corresponding to at least a portion of the plurality of instances, wherein, for a given instance, each configuration exception comprises a different instance-specific criteria than the corresponding configuration criteria for the cloud-based service;
responsive to determining the first suspect configuration setting corresponds to the first instance-specific configuration exception, determining whether the first suspect configuration setting satisfies a first instance-specific criteria of the first configuration exception; and
responsive to determining the first suspect configuration setting does not satisfy the first instance-specific criteria, transmitting a first alert message comprising the first suspect configuration setting to an administrator device associated with monitoring security of the network.

9. The method of claim 8, further comprising, responsive to determining that the first suspect configuration setting does not meet the instance-specific criteria, storing the suspect configuration setting in the result data file.

10. The method of claim 8, further comprising transmitting the first alert message comprising the first suspect configuration setting to a computing device associated with use of the first instance.

11. The method of claim 8, further comprising:
monitoring network traffic using a proxy log for the network;
identifying one or more candidate instances based on the network traffic; and
transmitting a list comprising the one or more candidate instances to an administrator computing device for further review.

12. The method of claim 8, wherein each instance-specific criteria of the instance exceptions is less stringent than a corresponding configuration criteria for the cloud-based service.

13. The method of claim 8, further comprising preventing storage, in the memory, of user activity information for the first instance.

14. The method of claim 8, wherein the first operating parameters comprise one or more of a maximum number of failed login attempts before blocking access to the instance, a maximum idle time by a user before automatic log out from the instance, Internet Protocol (IP) restrictions for the instance, and password complexity requirements for the instance.

15. A non-transitory computer readable medium storing instructions that when executed by a hardware processor cause the processor to:
access, via a network, using first credentials from a credentials database, a first instance of the cloud-based service, wherein the credentials database comprises sign-on credentials for accessing a plurality of instances of a cloud-based service;
extract first configuration settings of the first instance, wherein the first configuration settings comprise first operating parameters for the first instance;
determine, using a criteria database, a first suspect configuration setting from the first configuration settings by comparing the first configuration settings to the configuration criteria for the cloud-based service, wherein the first suspect configuration setting does not satisfy the configuration criteria, wherein the criteria database comprises predefined configuration criteria corresponding to approved operating parameters of the cloud-based service;
determine, using an exceptions database, whether the first suspect configuration corresponds to a first configuration exception of the first instance, wherein the exceptions database comprises predefined configuration exceptions corresponding to at least a portion of the plurality of instances, wherein, for a given instance, each configuration exception comprises a different instance-specific criteria than the corresponding configuration criteria for the cloud-based service;
responsive to determining the first suspect configuration setting corresponds to the first instance-specific configuration exception, determine whether the first suspect configuration setting satisfies a first instance-specific criteria of the first configuration exception; and
responsive to determining the first suspect configuration setting does not satisfy the first instance-specific criteria, transmit a first alert message comprising the first suspect configuration setting to an administrator device associated with monitoring security of the network.

16. The non-transitory computer-readable medium of claim 15, wherein the instructions, when executed by the hardware processor, further cause the processor to, responsive to determining that the first suspect configuration setting does not meet the instance-specific criteria, store the suspect configuration setting in the result data file.

17. The non-transitory computer-readable medium of claim 15, wherein the instructions, when executed by the hardware processor, further cause the processor to transmit the first alert message comprising the first suspect configuration setting to a computing device associated with use of the first instance.

18. The non-transitory computer-readable medium of claim 15, wherein the instructions, when executed by the hardware processor, further cause the processor to:
monitor network traffic using a proxy log for the network;
identify one or more candidate instances based on the network traffic; and
transmit a list comprising the one or more candidate instances to an administrator computing device for further review.

19. The non-transitory computer-readable medium of claim 15, wherein each instance-specific criteria of the instance exceptions is less stringent than a corresponding configuration criteria for the cloud-based service.

20. The non-transitory computer-readable medium of claim 15, wherein the first operating parameters comprise one or more of a maximum number of failed login attempts before blocking access to the instance, a maximum idle time by a user before automatic log out from the instance, Internet Protocol (IP) restrictions for the instance, and password complexity requirements for the instance.

\* \* \* \* \*